United States Patent
Kozarekar

(10) Patent No.: US 6,354,974 B1
(45) Date of Patent: Mar. 12, 2002

(54) POWER TRAIN FOR USE IN MOTOR VEHICLES AND THE LIKE

(75) Inventor: Shailesh Kozarekar, Farmington Hills, MI (US)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/558,184

(22) Filed: Apr. 26, 2000

(30) Foreign Application Priority Data

Apr. 26, 1999 (DE) .......................................... 199 18 787

(51) Int. Cl.$^7$ ................................................ B60K 6/02
(52) U.S. Cl. ......................................... 475/5; 180/65.2
(58) Field of Search .................... 475/5, 210; 180/65.2, 180/65.4

(56) References Cited

U.S. PATENT DOCUMENTS

| | | | |
|---|---|---|---|
| 5,217,412 A | | 6/1993 | Indlekofer et al. |
| 5,258,651 A | * | 11/1993 | Sherman ..................... 290/23 |
| 5,285,111 A | * | 2/1994 | Sherman ................. 180/65.2 X |
| 5,482,512 A | * | 1/1996 | Stevenson ....................... 475/5 |
| 5,558,175 A | * | 9/1996 | Sherman ..................... 180/65.2 |
| 5,667,448 A | | 9/1997 | Friedmann |
| 5,711,730 A | | 1/1998 | Friedman et al. |
| 5,846,155 A | * | 12/1998 | Taniguchi et al. .............. 477/2 |
| 5,934,395 A | * | 8/1999 | Koide et al. ................ 180/65.2 |
| 6,007,443 A | * | 12/1999 | Onimaru et al. ................ 475/5 |
| 6,022,287 A | * | 2/2000 | Klemen et al. ................. 475/5 |
| 6,146,302 A | * | 11/2000 | Kashiwase ...................... 475/5 |

FOREIGN PATENT DOCUMENTS

DE     196 25 022 A 1     1/1997

* cited by examiner

Primary Examiner—Charles A. Marmor
Assistant Examiner—Ankur Parekh
(74) Attorney, Agent, or Firm—Darby & Darby

(57) ABSTRACT

The output shaft of a combustion engine and/or the input shaft of a transmission in the power train of a motor vehicle is directly or indirectly connected to or connectable with the rotor of an electric machine. The stator of the electric machine surrounds the rotor and the latter surrounds, at least in part, a gearing and/or a clutch for and/or another constituent of the transmission. Such design contributes to compactness of the power train.

27 Claims, 2 Drawing Sheets

POWER TRAIN FOR USE IN MOTOR VEHICLES AND THE LIKE

BACKGROUND OF THE INVENTION

The present invention relates to power trains, especially for use in motor vehicles. More particularly, the invention relates to improvements in power trains of the type wherein a prime mover (such as an internal combustion engine) and a transmission (such as a continuously variable transmission) flank an electric machine having a stator and a rotor surrounded by the stator and operatively connected or connectable with the rotary output member (e.g., a first shaft) of the prime mover and/or with the rotary input member (e.g., a second shaft) of the transmission.

Published German patent application Serial No. 196 25 022 discloses a power train wherein the electric machine is coaxial with the output member of the prime mover and is installed axially between the prime mover and the transmission. For example, the electric machine can be put to use during starting of the prime mover (such as a combustion engine) in the power train of a motor vehicle. Alternatively, the electric machine can act as a booster, i.e., to assist the prime mover in transmitting torque to the input member of a change-speed transmission in the power train of a motor vehicle not only during starting but also in actual use of the motor vehicle. Still further, the electric machine can form part of or it can drive a current generator (charging system). It is also possible to employ the electric machine as a means for controlling the transmission during deceleration of a motor vehicle (recuperation). In many instances, the electric machine can be activated (e.g., positively connected in or disconnected from the power train) in response to engagement or disengagement of one or more clutches.

The placing of an electric machine axially between the prime mover and the transmission is desirable in many instances because this often contributes to optimal operation of the power train. On the other hand, heretofore known power trains which employ an electric machine between the prime mover and the transmission are likely to exhibit the drawback that their space requirements (especially in the axial direction of the output member of the engine) are excessive. This creates problems when the power train is to be installed under the hood of a motor vehicle wherein the axis of the output shaft of the engine is to extend transversely of the direction of movement of the vehicle.

Conventional power trains of the above outlined character frequently employ dry friction clutches (for example, to disconnect the electric machine from the prime mover and/or from the transmission, or to cooperate with starter clutches) which will operate satisfactorily (i.e., which will reliably transmit a desired torque) only if the diameters of their friction linings exceed a certain threshold value. Such friction linings must be installed outside of the rotor of an electric machine, i.e., axially in line with rather than radially around or within the rotor of the electric machine.

OBJECTS OF THE INVENTION

An object of the instant invention is to enhance the compactness of power trains which utilize electric machines.

Another object of the invention is to provide a power train wherein the transmission can be placed into close or immediate proximity to a prime mover such as the internal combustion engine in the power train of a motor vehicle.

A further object of the invention is to provide a power train wherein the electric machine can perform any one of a host of different functions, such as the task of a starter generator, of a hybrid starter and/or of a generator for conversion of mechanical energy into electrical energy during deceleration of the vehicle.

An additional object of the invention is to provide a power train which can perform one or more of the above outlined functions with a minimum of space requirement, during extended periods of use, and by resorting to simple and compact but reliable controls.

Still another object of the invention is to provide a motor vehicle which embodies a power train of the above outlined character.

A further object of the invention is to provide novel and improved controls for use in conjunction with the above outlined power train.

An additional object of the invention is to provide a novel and improved combination of an electric machine and a variable-speed transmission and/or a combustion engine or another prime mover in the power train of a motor vehicle.

SUMMARY OF THE INVENTION

The invention is embodied in a power train which can be utilized with advantage in a motor vehicle and comprises a prime mover (e.g., an internal combustion engine) including an output member (such as a shaft) rotatable about a predetermined axis, a transmission having a rotary input member (such as a shaft which is coaxial with and is connectable with the output member of the prime mover), and an electric machine which is coaxial with the output member and is located axially between the prime mover and the transmission. The improved power train further comprises an operative connection between the electric machine and the prime mover and/or the transmission. The electric machine comprises a stator and a rotor which is disposed radially inwardly of the stator and, in accordance with a desirable feature of the invention, the transmission includes at least one constituent which is located radially inwardly of the rotor.

The transmission is or can be constructed and assembled to transmit torque to the wheels of a motor vehicle.

The electric machine is or can be operatively connected with the output member of the prime mover and/or with the input member of the transmission. The operative connection can comprise at least one shiftable clutch, and the at least one constituent of the transmission can include a reversing gearing.

In accordance with a presently preferred embodiment, the at least one constituent of the transmission includes or constitutes a planetary transmission (hereinafter called planetary). Such transmission can comprise a sun gear, an internal gear, a planet carrier, and at least one planet pinion mounted on the carrier and mating with the two gears. The carrier can be connected with the sun gear or with a stationary housing; the latter can constitute the case of the transmission.

The improved power train can further comprise a torsional vibration damping device which is or which can be installed in a power flow between the prime mover and the electric machine or in a power flow between the electric machine and the transmission.

The prime mover and/or the transmission can be provided with a support (e.g., a flange which is coaxial with the output member of the prime mover), and the rotor can be journalled on or in such support. At least one bearing, preferably an antifriction roller bearing, can be installed between the support and the rotor.

The power train can further comprise an at least substantially sealed enclosure which is provided radially within the rotor, and at least a portion of the at least one constituent of the transmission is then confined in the enclosure. The enclosure can be at least partially filled with a fluid bath, particularly an oil bath.

The transmission can comprise a continuously variable transmission (CVT), and the rotor of the electric machine is or can be coaxial with the input member of such transmission.

The at least one constituent of the transmission can constitute at least one clutch, e.g., a disc clutch (particularly a multiple-disc clutch). The means for engaging and disengaging the at least one clutch can include at least one piston which is movable in the axial direction of the output member of the prime mover. Such piston can form part of a hydraulic cylinder and piston unit. The aforementioned means for engaging and disengaging the at least one clutch can further include a source of pressurized fluid and means for regulating the flow of pressurized fluid from the source to the cylinder for the at least one piston. The source preferably contains a hydraulic fluid, and the regulating means can comprise one or more valves, e.g., one or more on-off valves and/or one or more proporal valve.

The at least one constituent can include a transmission ratio varying portion of the transmission, for example, of a transmission having a plurality of gear ratios.

The novel features which are considered as characteristic of the invention are set forth in particular in the appended claims. The improved power train itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
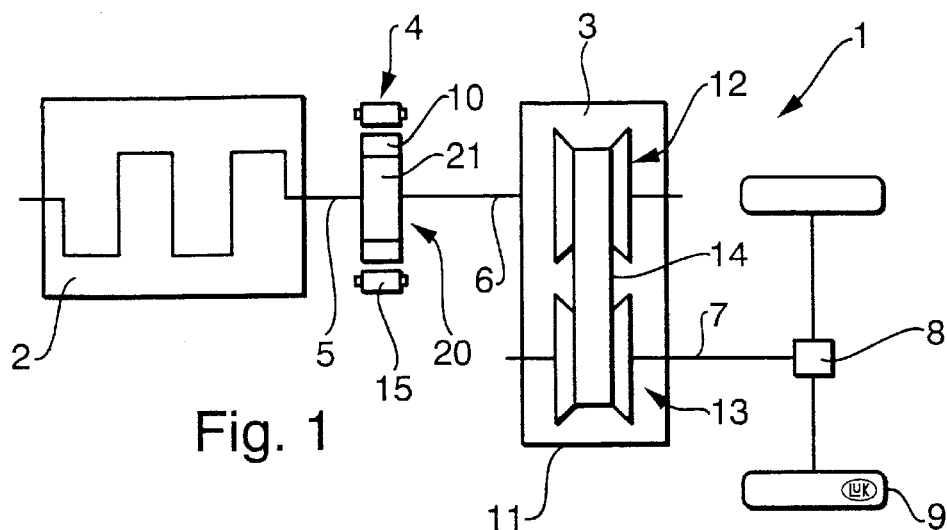
FIG. 1 is a diagrammatic plan view of a power train which is installed in a motor vehicle and embodies one form of the present invention.

FIG. 1 shows a power train 1 which is installed in a motor vehicle and comprises a prime mover 2 (such as an internal combustion engine) having a rotary output member 5 (e.g., a camshaft or a crankshaft) arranged to drive the coaxial input member (such as a shaft) 6 of a multiple speed ratio transmission 3. The rotary output member 7 of the transmission 3 drives the front and/or rear wheels 9 of the motor vehicle by way of a differential 8. The illustrated transmission 3 is a continuously variable transmission (CVT), e.g., of the type disclosed in commonly owned U.S. Pat. No. 5,217,412 (granted Jun. 8, 1993 to Indlekofer et al.), U.S. Pat. No. 5,667,448 (granted Sep. 16, 1997 to Friedmann) or U.S. Pat. No. 5,711,730 (granted Jan. 27, 1998 to Friedmann et al.). The disclosures of all U.S. and foreign patents and patent applications identified in the specification of the present application (including the German priority application Serial No. 199 18 787.8 filed Apr. 26, 1999) are incorporated herein by reference.

The power train 1 of FIG. 1 further comprises a machine 4 which converts electric energy into mechanical energy (hereinafter called electric machine or machine for short) and is located between the prime mover 2 and the transmission 3, as seen in the axial direction of the out-put member 5. The machine 4 is coaxial with the output member 5, and hence also with the input member 6, and includes a stator 15 surrounding a rotor 10.

The rotor 10 of the machine 4 can receive and/or transmit torque from(to) the member 5 or 6 by means of one or more suitable clutches (not shown in FIG. 1). Such clutch or clutches enables or enable the power train 1 to operate as follows (as well as in one or more additional manners which will become obvious upon perusal of this specification and/or are not considered as being of immediate interest in connection with the practice of the present invention.

(a) The electric machine 4 can be operated to start the prime mover 2, either directly or by way of an engaged or engageable clutch between the rotor 10 and the output member 5.

(b) The electric machine 4 can be started while a suitable clutch between the rotor 10 and the output member 5 is still disengaged. When the mass of the rotor 10 is being accelerated so that its inertia rises to a preselected value, the prime mover 2 is started in an impulse-like fashion in response to engagement of the clutch. The machine 4 may but need not always assist the output member 5 and the clutch (between 2 and 4) in transmitting torque to the input member 6.

(c) Generator operation of the electric machine 4 while the clutch between the prime mover 2 and the machine 4 is engaged (or in the absence of such clutch); recuperation while the clutch between the prime mover 2 and the transmission 3 is engaged (or in the absence of such clutch), i.e., while the path for the flow of power between the wheels 9 and the machine 4 is completed. Under such circumstances, it is advisable to achieve a disengagement of a clutch between the prime mover 2 and the electric machine 4 or to avoid the development of drag torque of the prime mover (combustion engine) 2 in response to planned opening of combustion chamber valves (in the absence of a clutch between the prime mover 2 and the machine 4).

(d) The input member 6 of the transmission 3 can be driven by the output member 5 jointly with the electric machine 4 (boosting) upon engagement of a first clutch between the prime mover 2 and the machine 4 as well as of a second clutch between the driving units 2, 4 on the one hand and the transmission 3 on the other hand.

(e) The transmission 3 is driven by the machine 4 (in the absence of a clutch between the rotor 10 and the output member S and while the clutch between the rotor 10 and the member 6 is disengaged, or in the absence of a clutch between 4 and 6 and while the drag torque of the prime mover is possibly reduced).

The clutch or clutches can be installed in the region between the electric machine 4 and the prime mover 2, preferably radially inwardly of the rotor 10. However, a starter clutch can also be installed within the transmission case 11. It is clear that the starting of the motor vehicle embodying the prime mover 2 necessitates the utilization of at least one clutch, either in the power flow between the prime mover 2 and the electric machine 4 or between the electric machine and the transmission 3. In addition, if a starter clutch is installed between the electric machine 4 and the transmission 3, a disengaging clutch can be provided between the prime mover 2 and the electric machine.

The illustrated transmission 3 can be replaced with a manually shiftable or with an automatic transmission. The continuously variable transmission (CVT) 3 of FIG. 1 comprises two adjustable pulleys including a driving pulley 12 and a driven pulley 13, as well as an endless flexible element 14 (e.g., a chain) which is trained over the two pulleys. Each pulley has an axially movable normally conical flange. One flange of one of the pulleys 12, 13 is adjustable to change the tension of the flexible element 14, and one flange of the other pulley is adjustable to vary the ratio of the transmission 3. The output member (shaft) 7 of the transmission 3 drives the differential 8 at a speed which depends upon the ratio of the radii of those (arcuate) portions of the flexible element 14 which are then looped around the pulleys 12, 13. The manner in which the ratio of the transmission 3 is variable (e.g., electrically, pneumatically and/or hydraulically) is or S can be the same as described in the aforementioned commonly owned U.S. patents to Indlekofer et al., .Friedmann '448 and Friedmann et al. '730.

Figure 2:
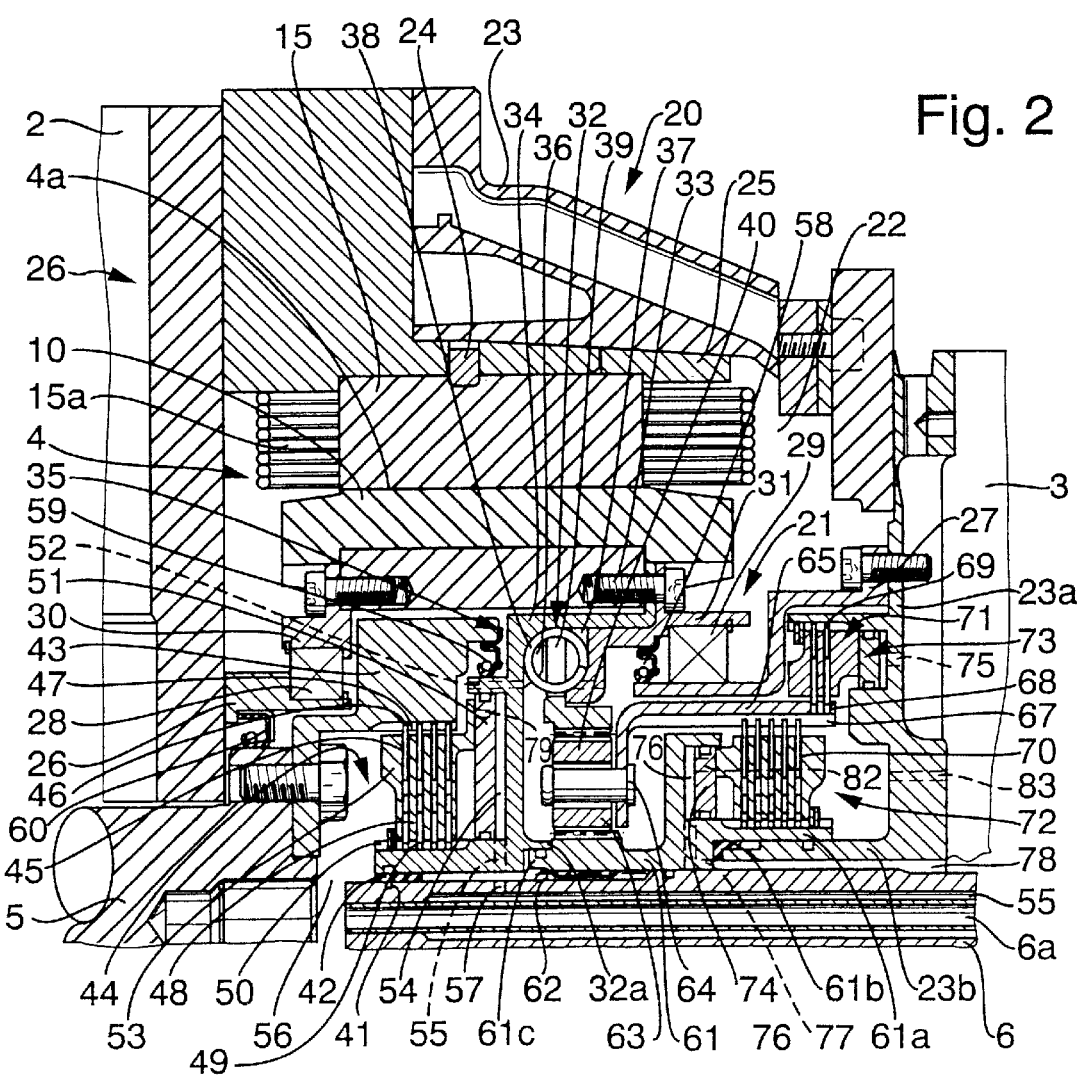
FIG. 2 is an enlarged fragmentary schematic axial sectional view of the power train which is shown in FIG. 1.

FIG. 1 shows that the power train 1 further comprises a connecting unit 20 which can establish a driving connection between the prime mover 2 and the transmission 3 by way of the output member S and the input member 6. The connecting unit 20 comprises a constituent 21 forming part of the transmission 3 and being installed, at least in part, radially inwardly of the rotor 10 of the electric machine 4, i.e., radially inwardly of the stator 15 and rotor 10. In other words, the constituent 21 is installed between the prime mover 2 and the major part of the transmission 3 (as seen in the direction of the common axis of the members S, 6 and machine 4) as well as at least in part radially inwardly of the rotor 10. This entails substantial and heretofore non-contemplated savings in space, for example, as seen in the axial direction of the members 5 and 6. The stator 15 of the machine 4 is non-rotatably and otherwise non-movably affixed to the transmission case 23 (this is shown in FIG. 2).

The constituent 21 can constitute or form part of any one of a plurality of different components of the transmission 3. For example, the constituent 21 can constitute or form part of a planetary gearing (hereinafter called planetary, shown and denoted in FIG. 2 by the same reference character) which can further include one or more associated devices such as clutches, brakes, freewheels and/or the like.

For example, the constituent 21 can constitute a step-up and/or step-down gearing for the transmission 3. The gearing of the constituent 21 can be set up to change (when necessary) the RPM of the output member 7 of the transmission 3 already at the location of (within) the rotor 10; such change can involve an increase or a reduction of RPM of the output member 7. Thus, the constituent 21 can compel the transmission 3 to exhibit a more pronounced overall spreading and/or to increase the overall number of stages or gear ratios of the transmission. By way of example, under ideal circumstances a transmission with two preliminary gear ratios can double the number of transmission gear ratios. Such shifting takes place without a change in the direction of rotation. A movement in reverse can be realized; however, this necessitates only one gear ratio.

The placing of the constituent 21 radially inwardly of the rotor 10 not only reduces the overall space requirements of the prime mover 1 but it also enhances the maneuverability of and more convenient access to various parts of the transmission 3 and/or to the output member 5 of the prime mover 2. Such constituent can be put to use in the selection of one or several (e.g., three or five) forward gear ratios and/or at least one reverse gear; in either event, the expedient of placing at least one constituent (21) of the transmission 3 radially inwardly of the rotor 10 ensures a more effective utilization of the space under the hood of a motor vehicle due to extensive savings in space as seen in the axial direction of the output member S, as well as more convenient access to the part(s) or component(s) which need not be installed within the transmission case 11 (denoted in FIG. 2 by the reference character 23). More convenient access contributes to savings in time for the purposes of inspection, testing and repair.

FIG. 2 shows a connecting unit 20 which includes a reversing gear 21, namely the aforementioned planetary. The major part of the planetary 21 is confined in the bell 22 of the transmission case 23. The electric machine 4 of FIG. 2 comprises a stator 15 with windings 15a; this stator is fixedly installed in the transmission case 23 by means of suitable fasteners 24 (such as screws, bolts or the like). An abutment or stop 25 is provided to maintain the stator 15 in a predetermined axial and also in a predetermined angular position.

It is also possible and within the purview of the present invention to install the stator 15 at or on the housing 26 of the prime mover 2, especially in such a way that the stator is mounted jointly with the rotor 10 of the electric machine 4. For example, the electric machine 4 can be mounted on the housing 26 in such a way that the stator 15 and the rotor 10 establish a predetermined clearance 4a when the mounting of the preassembled machine 4 on or in the housing 26 is completed. Still further, the stator 15 can be furnished with a cooling unit (not shown); to this end, the core of the stator 15 can be designed to establish a path for the circulation of a fluid coolant (such as water). The cooling unit for the stator 15 can form part of the cooling unit for the prime mover 2 or it can constitute a discrete cooling device.

The rotor 10 is installed radially within the stator 15 and is journalled in antifriction roller bearings 28, 29. In the embodiment of FIG. 2, the bearing 28 is mounted in a flange-like support 26a of the housing 26, and the bearing 29 is mounted in a flange-like support 27 of the transmission case 23. The supports 26a, 27 can be of one piece with the housing 26 and case 23, respectively, and the parts 23, 26 can be fixedly secured to each other by bolts or the like. The parts 23, 26 together constitute a composite casing or housing which non-rotatably carries the stator 15 and rotatably supports the rotor 10 of the electric machine 4 by way of the supports 26a, 27 and bearings 28, 29 so that the rotor is coaxial with the output member 5 of the prime mover 2.

The reference character 30 denotes an annular member or collar which is affixed (such as screwed or bolted) to and surrounds the rotor 10 and is mounted at that side of the bearing 28 which confronts the prime mover 2. A second flange-like member or collar 31 is mounted on the bearing 29 and confronts the transmission 3. A two-piece input element 32 of the planetary 21 includes the collar 31 and a second collar 34 which is affixed to the collar 31 by fasteners 33 (e.g., screws or bolts) together forming annular arrays of fasteners adjacent the end faces of the rotor 10.

The transmission of torque to and from the electric machine 4 and from the prime mover 2 takes place by way of the two-piece input element 32 composed of the flange-like members 31, 34. The dimensions of the input element 32 increase radially inwardly and this element forms part of a damper 35. The members 31, 34 respectively comprise entraining elements 36, 37 for energy storing elements 38 which extend and are spaced apart from each other in a circumferential direction of the members 31, 34 and form part of the damper 35. The energy storing elements 38 (e.g., in the form of arcuate coil springs) are effective in a circumferential direction of the rotor 10. These energy storing elements react against the entraining elements 36, 37 and bear upon the circumferentially spaced-apart arms 39 which extend radially outwardly from the internal gear 40 of the planetary 21. The arms 39 extend between the flange-like members 31, 34 and engage those end convolutions of the energy storing elements 38 which are remote from the corresponding entraining elements 36, 37. Thus, the energy storing elements 38 must yield (store energy) if the input element 32 is to move relative to the internal gear 40 of the planetary 21. The extent to which the parts 32, 40 can change their angular positions relative to each other is determined by abutments or stops (not shown) or the parts 32, 40 can no longer turn relative to each other when the energy storing elements 38 are stressed (compressed) to such an extent that the neighboring convolutions of each energy storing element 38 actually abut each other.

It will be appreciated that, in dependency upon the upstream and downstream flywheels or masses (such as, for example, the mass of the rotor 10 as a primary flywheel and, e.g., the transmission 3 and/or discrete secondary flywheels provided in the region of the planetary 21, can produce upon torsional vibrations an isolating effect analogous to that of a split flywheel. It might be of advantage if the flywheel mass is installed in the power flow between the transmission 3 or the planetary 21 and the output member, i.e., the corresponding stage (gear ratio) of the transmission because this can exert a desirable effect upon the extent of angular displacement of the output member 5 of the prime mover 2 and the input member 6 of the transmission 3.

The transmission of torque from the prime mover 2 into the planetary 21 and thereafter through the transmission input member 6 and transmission 3 to the wheels 9 of the is motor vehicle takes place in the same way from the two-piece input element 32 by way of the radially inwardly extending flange-like member 34; this member extends to the transmission input member 6 and includes an extension 41 which projects axially toward the prime mover 2. The extension 41 is rotatably mounted on the input member 6 by means of a sleeve forming part of a slide or friction bearing 42 or in another suitable way.

A flywheel 43 is immediately adjacent the internal surface of the rotor 10 and is fixedly secured to the output member 5 by means of threaded fasteners or in another suitable way. This flywheel 43 and the axial extension 41 of the flange-like member 31 flank a disengaging clutch 44 which can be operated to disconnect the prime mover 2 from the electric machine 4. The illustrated clutch 44 is a hydraulically operable disc clutch including a first set of axially movable discs 45 having radially outer profiled portions 46 form-lockingly engaging internal profiles 47 provided on the flywheel 43. The complementary discs 44 have external profiles 49 form-lockingly engaging internal profiles 50 provided on the flange-like member 34. The discs 45 alternate with and frictionally engage the neighboring discs 48 in response to the application of axial stresses by an axially shiftable piston 51. The radially outer portion of the piston 51 sealingly engages an axially extending rim 52, and the radially inner portion of this piston sealingly engages the axial extension 41 of the flange-like member 34. When the clutch 44 is engaged, it cooperates with an annular abutment or stop 53 to establish a frictional torque-transmitting connection between the flywheel 43 and the member 34; the axially movable discs 45 of the clutch 44 are then subjected to axial stresses between the piston S and the abutment 53.

The piston 51 and the member 34 are axially spaced apart from each other and define a chamber 54 which communicates with and receives hydraulic fluid from a bore or channel 55 provided in the hollow input member 6 of the transmission 3. The bore or channel 55 receives pressurized fluid from a pump 81 (or another suitable source, see FIG. 3) and communicates with the chamber 54 by way of a radial opening 57 in the member 6. A compartment 56 is outwardly adjacent the abutment 53 and is sealed from the outside by suitable sealing elements 58, 59 and 60. The compartment 56 is also at least partially filled with a pressurized hydraulic fluid. The piston 51 is moved axially to engage the friction clutch 44 when the fluid pressure in the compartment 56 exceeds that in the chamber 54.

The input element 32 of the damper 35 can transmit torque from the prime mover 2 and/or from the electric machine 4 by way of the damper and on to the planetary 21. The latter is installed essentially radially inwardly of the damper 35 and includes the aforementioned internal gear 40 and a sun gear 61; the sun gear is non-rotatably mounted (e.g., by means of mating teeth or splines 62) on the input member 6 of the transmission 3. The gears 40, 61 mate with one or more planet pinions 63 which have shafts 64 mounted on a planet carrier 65.

The planet carrier 65 is a cupped member which is open toward the transmission 3 and mounts the rotor 10 on the transmission. The inner and outer sides of the planet carrier 65 are respectively provided with profiles 67, 68 in the form of axially parallel teeth which non-rotatably but axially movably engage two sets of alternating discs 69, 70 forming part of friction clutches 71, 72 analogous to the afore-described friction clutch 44. The clutches 71, 72 further comprise axially movable pistons 73, 74 which can be displaced axially by bodies of pressurized hydraulic fluid. The piston 73 is sealed against a section 23a of the transmission case 23 and can be shifted axially by pressurized hydraulic fluid supplied by way of a conduit 75 which is connected to the pump 81 or to another suitable source. The piston 74 is axially movably mounted on a radially enlarged extension 76 of the sun gear 61, and this piston can effect an engagement of the clutch 72 in response to the application of pressure by a hydraulic fluid. Such fluid is supplied via opening 77 which is provided in the sun gear 61 and communicates with a compartment or chamber 78 disposed between an axial extension 23b of the transmission case 23 and the transmission input member 6. The chamber 78 can receive pressurized hydraulic fluid from a discrete source or from the aforementioned source (pump) 81.

The clutches 71, 72 determine the extent of movability of the planet carrier 65 and thus control the condition or setting of the planetary 21; such clutches can select any one of two gear ratios. A first gear ratio is selected when the transmission 3 is to transmit torque in a sense to move the motor vehicle forwardly; at such time, the forward gear ratio is fixed (unchanging) and the planet carrier 65 is in frictional engagement with the sun gear 61 by way of the then engaged clutch 72 (the clutch 71 is disengaged). Thus, the planet pinion(s) 63 and the sun gear 61 are then held against rolling movement relative to each other which entails that the internal gear 40 of the planetary 21 and the sun gear 61 are compelled to rotate as a unit in the direction of rotation of the output member 5 of the prime mover 2.

If the clutch 72 is disengaged and the clutch 71 is engaged, the planet carrier 65 is in frictional engagement with the transmission case 23; this fixes the planetary movements of the pinion(s) 63 but such pinion(s) is or are free to rotate about the axis or axes of the respective shaft or shafts 64 while in mesh with the gears 61 and 40. Consequently, the input member 6 of the transmission 3 is compelled to rotate counter to the direction of rotation of the output member 5 of the prime mover 2. The speed of angular movement of the input member 6 is reduced and this input member is driven in a direction to move the motor vehicle in reverse.

If the clutch 71 is disengaged simultaneously with the clutch 72, the planet carrier 65 as well as the pinion(s) 63 is or are free to rotate about its axis or their respective axes; consequently, only negligible fractions of drag torque furnished by the clutches 71, 72 can be transmitted to the input member 6 of the transmission 3.

The illustrated clutches 44, 71, 72 are wet clutches which receive pressurized hydraulic fluid (such fluid can serve as a coolant as well as a lubricant) by way of the axial bore 6a of the input member 6 and spray nozzles 79, 82, 83, respectively.

As already described hereinbefore, the connecting unit 20 is mounted on the transmission input member 6 by way of the axially oriented slide bearing 42 of the input element 32. The sun gear 61 is non-rotatably mounted on the input member 6 and is sealed from a compartment 78. This sun gear comprises a flange-like extension 61a which projects axially toward the transmission 3, which is surrounded by the clutch 72, which is rotatably mounted on the axial extension 23b of the transmission case 23, and which is sealed at the case 23 by a suitable seal or a slide bearing sleeve 61b. The input element 32 is provided with an axially extending projection 32a which is rotatably mounted on a shoulder 61c of the sun gear 61.

Figure 3:
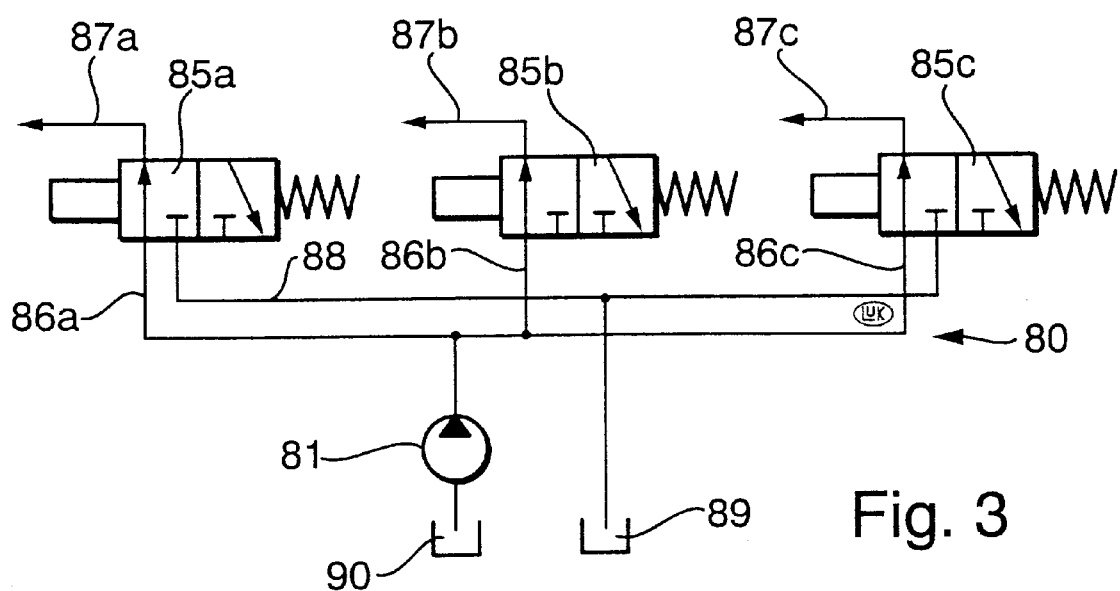
FIG. 3 is a diagram of the hydraulic control system for the clutches in the power train of FIGS. 1 and 2.

FIG. 3 illustrates one embodiment of a hydraulic circuit 80 which can be employed to supply pressurized fluid in order to operate the clutches 44, 71, 72 in the arrangement of FIG. 2. The circuit 80 comprises the hydraulic pump 81 (e.g., a radial piston pump or a vane pump) which can draw fluid from a reservoir 90 and can supply pressurized fluid (e.g., oil) to the respective ports of three pressure regulating valves 85a, 85b, 85c by way of conduits 86a, 86b, 86c, respectively. The valves 85a, 85b, 85c can deliver pressurized fluid to conduits 87a, 87b, 87c which, in turn, can supply pressurized fluid to the conduit or bore 55, conduit 75 and conduit 77 shown in FIG. 2 and serving to supply fluid to the clutches 44, 71 and 72, respectively. The fluid flows which are supplied by the conduits 55, 75 and 77 can respectively shift the axially movable pistons 51, 73 and 74 of the respective clutches 44, 71 and 72.

The means for moving the axially movable valving elements of the valves 85a, 85b, 85c in order to permit or interrupt or vary the rate of flow of pressurized fluid from the conduits 86a, 86b, 86c into the respective conduits 87a, 87b, 87c are not shown in FIG. 3. Each of the valves 85a, 85b, 85c can further connect the respective conduit 86a, 86b, 86c or 87a, 87b, 87c with a return conduit 88 serving to deliver fluid to the reservoir 89. The latter can deliver fluid to or can form part of the reservoir 90. Suitable means for filtering and/or otherwise cleaning or influencing the fluid can be provided between the reservoirs 89, 90 or between the reservoir 90 and the intake of the pump 81.

The pump 81 can further serve to supply pressurized hydraulic fluid to additional consumers in the power train 1 of FIG. 1. For example, such pump can supply fluid to various cylinder-piston units forming part of the transmission 3 shown in FIG. 1 and serving to adjust the pulley 12 and/or 13, e.g., to change the tension of the flexible element 14 and/or to change the ratio of the transmission 3.

It is further within the purview of the instant invention to replace the illustrated valves 85a, 85b and 85c with a single valve which is designed to independently control the flow of pressurized fluid to one, two or all three clutches 44, 71, 72 and the flow of fluid back to the reservoir 89. Still further, the valves 85a–85c can constitute relatively simple on-off valves or more complex proportional valves capable of accurately metering and varying the rate of fluid flow from the conduits 86a–86cto the respective conduits 87a–87c. The utilization of one or more proportional valves normally entails the provision of suitable adjustable flow restrictor (throttle) means in the respective conduit(s) 87a, 87b, 87c, 55, 75 and/or 77; this renders it possible to ensure gradual engagement and/or disengagement of the clutch 44, 71 and/or 72.

On-off valves and proportional valves which can be utilized in the hydraulic circuit 80 of FIG. 3 are described, for example, on pages 236–239 of Chapter 7 in German-language publication entitled "Grundlagen der Ölhydraulik" (Basics of oil hydraulics) by W. Baeke and H. Murrenhoff.

To recapitulate and to elaborate upon additional aspects and advantages of the invention:

An important advantage of the improved power train is that its space requirements, particularly in the axial direction of the output member S, are reduced to a surprisingly large extent by the novel expedient of installing one or more constitutents (such as the damper 35, the planetary 21 and/or the clutch 44) radially inwardly of and possibly within the rotor 10 of the electric machine 4. The aforementioned constituent or constituents occupy space which remains unoccupied in conventional power trains.

Additional savings in space, especially axially of the output member 5, can be achieved by reducing the axial space requirements of the prime mover 2, e.g., by replacing an in-line combustion engine with a V-type and/or by reducing the number of cylinders in the combustion engine. The utilization of the illustrated continuously variable transmission 3 of FIG. 1 in lieu of many other presently known and utilized transmissions also contributes to savings in space as considered in the axial direction of the output member 5. It will be understood, however, that the power train of the present invention can employ any one of several types of transmissions other than the CVT shown in FIG. 1; for example, it is possible to employ a manually or automatically shiftable transmission with a limited number of forward gear ratios and a reverse gear.

Another advantage of the improved power train is that one or more constituents of the transmission 3 or another transmission can be constructed, assembled and installed to extend radially as well as axially into the space which is surrounded by the rotor 10 of the electric machine 4. This can be readily seen by referring to FIG. 2. Moreover, the interior of the rotor 10 can be caused to define one or more radial chambers and/or compartments which are at least partially sealed from certain units of the transmission and/or from certain parts of the prime mover, e.g., by means of the aforementioned flanges at the internal surface of the rotor and/or on a part of the prime mover 2. The electric machine 4 is or can be installed to surround a portion of the transmission 3 or another transmission, and such electric machine can be integrated into the transmission, for example, by installing such machine in the transmission case 23.

The placing of the planetary 21 of the transmission 3 into the rotor 10 of the electric machine 4 shown in FIG. 2 is particularly advantageous if the transmission is or includes a CVT. It has been ascertained that such design of the transmission and of a combination of CVT with the electric machine 4 takes up much less space (as seen in the axial direction of the output member 5) than heretofore known electric machine-transmission combinations. Thus, the axial length of the input member 6 can be reduced to a considerable extent. Moreover, the improved power train can utilize a surprisingly compact planetary 21 if the sun gear 61 is form-lockingly connected with the transmission input member 6, if the internal gear 40 is force-lockingly connected with the prime mover, and if the planet carrier 65 is connectable with the transmission case 23 or with the prime mover 2 and sun gear 61 (or with a part which is force-lockingly connected to the sun gear) by means of discrete clutches 71, 72 which are installed radially within the rotor 10. Each of these clutches can act as a starter clutch, one in a forward direction and the other in reverse.

The clutch 44 serves to establish a torque transmitting connection between the prime mover 2 and the electric machine 4. As shown in FIG. 2, this clutch can also find room within the rotor 10. An important advantage of the clutch 44 is that, when it is disengaged, the motor vehicle can be set in motion by the electric machine 4 alone, recuperation can take place without drag torque from the prime mover and/or it is possible to start the prime mover by means of an impulse-like operation involving an acceleration of the mass of the rotor in a first step, namely prior to engagement of the clutch 44 so that the rotating mass of the electric machine 4 alone, or the driven machine, assists in a starting of the prime mover 2. If the clutch 44 is engaged at the onset of the starting operation, one can achieve a direct start of the motor vehicle.

Another feature of the invention resides in the utilization of a transmission constituent for the adjustment of a transmission having at least one gear ratio. Such a pretransmission can be of particular advantage if the transmission is not a gearing but another type such as the CVT transmission of FIG. 1. This renders it possible to achieve a further increase of spreading of the transmission and/or to operate the transmission at a constant ratio or to bypass the transmission when only the electric machine 4 or an equivalent thereof functions as a prime mover. This brings about the advantage that the forces acting upon the pulleys 12, 13 of the CVT 3 are minimized or are non-existent which, in turn, reduces the energy requirements of the source (such as the pump 81 of FIG. 3) of pressurized hydraulic fluid for the cylinder-and-piston units serving to adjust the pulleys. Such mode of operation of the improved prime mover can be resorted to for moving the motor vehicle through relatively short distances such as during parking or unparking, for driving in city traffic and for analogous purposes.

The transmission components for the aforementioned pretransmission can constitute stationary or rotary gearings the ratios of which can be selected by suitable clutches of any one of a host of different classes including those which are engaged or disengaged from without as well as automatic clutches including clutches which are actuatable by centrifugal force or in response to the application of torque. It is further clear that a transmission for preselection of a ratio can be combined with a reversing gearing to form a complete unit.

As shown in FIG. 2, it is also of advantage, at least under certain circumstances, to install at least one clutch radially inwardly of the rotor 10. In fact, it is even more advisable to install all of the necessary clutches within the confines of the rotor. For example, the planetary 21 can be installed between the clutch 44 (which can transmit torque between the prime mover 2 and the electric machine 4) and the clutches 71, 72 which control the direction of rotation of the output member 7 of the transmission 3. The clutch 72 which can be engaged to rotate the shaft 7 forwardly is installed radially inwardly of the other clutch 71 which latter causes the member 7 to drive the wheels 9 in a direction to move the motor vehicle in reverse. The clutches can be of the wet type, dry type clutches or combined wet/dry clutches. If the clutches are disc clutches, they are preferably of the wet type and are engaged and disengaged by a reciprocable fluid-operated piston.

The torsional vibration damper 35 also constitutes a desirable novel feature of the improved power train. This damper is preferably constructed, assembled and installed to damp torsional vibrations which are transmitted by the prime mover 2. As already described above, the damper can be designed in such a way that the mass of the rotor constitutes a primary flywheel and can turn, against the opposition of the energy storing elements 38, relative to a secondary flywheel, e.g., on the input member 6. The secondary flywheel can be provided in the transmission case 23 or within the rotor 10. The damper 35 can operate by resorting to the twin- or dual-mass effect to shift the resonance frequency of torsional vibrations below the characteristic idling RPM of the prime mover 2. It is also of advantage to permit angular movements of the primary and secondary flywheels relative to each other and to ensure that the ratio of the gearing portion forming part of the gearing radially inwardly of the rotor 10 is effective in the power flow; this produces the dual- or twin-mass effect with different angular displacements or angles of the primary and secondary flywheels.

It is also possible to provide a torsional vibration damper in the power flow between the rotor 10 and the transmission constituent which is installed radially inwardly of the rotor. The input member of such damper can be constituted by the rotor 10, and the output member can be constituted by the internal gear 40 of the planetary 21. The rotor is then connected with the output member 5 of the prime mover 2.

The electric machine 4 is installed axially between the prime mover 2 and the transmission 3. The stator 15 is stationary and the rotor 10 is rotatably mounted on the housing of the prime mover 2 and/or on the case 23 of the transmission 3. As already pointed out in connection with the description of FIG. 2, it is particularly advantageous to mount the rotor 10 and the stator 15 on one or more flange-like members in such a manner that the parts 10, 15 of the electric machine define a radial gap or clearance 4a of a predetermined width. The electric machine 4 can constitute a module which is assembled to an extent permitting its attachment to the prime mover 2 and/or on the transmission 3.

The compartment 56 is preferably sealed to prevent penetration of contaminants into that constituent or into those constituents of the transmission 3 which is or are confined within the rotor 10. Furthermore, the compartment 56 can receive and store a supply of suitable lubricant for the aforementioned constituent(s) of the transmission 3 or another suitable transmission. Such supply can constitute an oil bath for at least some of those parts of the transmission which are not confined in the transmission case 23 but rather in the rotor 10 or are located radially inwardly of the rotor. The compartment 56 can confine at least one wet clutch but preferably two or more (all) clutches each of which can constitute a wet clutch. Each such clutch can be engaged and disengaged in response to axial displacement of a piston or plunger as a result of a rise of pressure of hydraulic fluid in a plenum chamber of the corresponding clutch.

Without further analysis, the foregoing will so fully reveal the gist of the present invention that others can, by applying current knowledge, readily adapt it for various applications without omitting features that, from the stan-point of prior art, fairly constitute essential characteristics of the generic and specific aspects of the above outlined contribution to the art of power trains for use in motor vehicles and the like and, therefore, such adaptations should and are intended to be comprehended within the meaning and range of equivalence of the appended claims.

What is claimed is:

1. A power train comprising:

a prime mover including an output member rotatable about a predetermined axis;

a transmission having a rotary input member connectable with said output member;

an electric machine coaxial with said output member and located axially between said prime mover and a first section of said transmission; and an operative connection between said machine and at least one of said prime mover and said first section of said transmission, said machine including a stator and a rotor disposed radially inwardly of said stator, said transmission including at least one constituent located radially inwardly of said rotor, said at least one constituent of said transmission including a reversing gearing, and wherein said transmission comprises a continuously variable transmission.

2. The power train of claim 1, wherein said prime mover is a combustion engine.

3. The power train of claim 1, wherein said transmission is constructed and assembled to transmit torque to the wheels of a motor vehicle.

4. The power train of claim 1, wherein said electric machine is operatively connected with at least one said output member and said input member.

5. The power train of claim 1, wherein said operative connection comprises at least one shiftable clutch.

6. The power train of claim 1, wherein said at least one constituent includes a planetary.

7. The power train of claim 6, wherein said planetary comprises a sun gear, an internal gear, a planet carrier, and at least one pinion mounted on said carrier and mating with said gears.

8. The power train of claim 7, wherein said carrier is connected with one of said sun gear and a stationary housing.

9. The power train of claim 8, wherein said stationary housing includes a case of said transmission.

10. The power train of claim 1, further comprising a torsional vibration damping device in a power flow between said prime mover and said electric machine.

11. The power train of claim 1, further comprising a torsional vibration damping device in a power flow between said electric machine and said transmission.

12. The power train of claim 1, wherein at least one of said prime mover and said transmission comprises a support and said rotor is journalled on said support.

13. The power train of claim 12, wherein said support comprises a flange coaxial with said output member.

14. The power train of claim 12, further comprising at least one antifriction roller bearing between said support and said rotor.

15. The power train of claim 1, further comprising an at least substantially sealed enclosure provided radially within said rotor, at least a portion of said constituent being confined in said enclosure.

16. The power train of claim 15, further comprising a fluid bath in said enclosure.

17. The power train of claim 1, wherein said rotor is coaxial with said input member.

18. The power train of claim 1, wherein said at least one constituent includes at least one clutch.

19. The power train of claim 18, wherein said at least one clutch is a disc clutch.

20. The power train of claim 18, wherein said at least one clutch is a multiple-disc clutch.

21. The power train of claim 18, further comprising means for engaging and disengaging said at least one clutch, said means for engaging and disengaging including at least one piston movable in the direction of said axis.

22. The power train of claim 21, wherein said piston forms part of a hydraulic cylinder and piston unit.

23. The power train of claim 21, wherein said means for engaging and disengaging said at least one clutch further includes a source of pressurized fluid and means for regulating the flow of pressurized fluid from said source to a cylinder for said at least one piston.

24. The power train of claim 23, wherein said source contains a hydraulic fluid and said regulating means comprises at least one valve.

25. The power train of claim 24, wherein said at least one valve is one of an on-off valve and a proportional valve.

26. The power train of claim 1, wherein said at least one constituent includes a transmission ration varying portion of said transmission.

27. The power train of claim 26, wherein said transmission has a plurality of gear ratios.

* * * * *